(12) United States Patent
Ioki (10) Patent No.: US 6,339,558 B1
(45) Date of Patent: Jan. 15, 2002

(54) FIFO MEMORY DEVICE AND FIFO CONTROL METHOD

(75) Inventor: Kazuya Ioki, ShigaKen (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/688,022

(22) Filed: Oct. 13, 2000

(30) Foreign Application Priority Data

Oct. 15, 1999 (JP) .......................................... 11-293628

(51) Int. Cl.[7] ................................................ G11C 7/00
(52) U.S. Cl. ................... 365/221; 365/239; 365/230.05
(58) Field of Search ................................ 365/221, 239, 365/230.05

(56) References Cited

U.S. PATENT DOCUMENTS 5,594,702 A * 1/1997 Wakeman et al. ..... 365/230.05
5,841,722 A * 11/1998 Willenz ...................... 365/221

\* cited by examiner

*Primary Examiner*—Huan Hoang
(74) *Attorney, Agent, or Firm*—Lynn L. Augspurger, Esq.; Kevin P. Radigan, Esq.; Heslin Rothenberg Farley & Mesiti P.C.

(57) ABSTRACT

In order to integrate two FIFOs such as a transmitting FIFO and a receiving FIFO into one FIFO so that a memory area is effectively used, a FIFO memory device 10 comprises a transmitting FIFO control section 20 for writing transmission input data to a memory 100 and outputting the transmitted data written to the memory 100 in order of the data inputting, a receiving FIFO control section 30 for writing receipt input data to the memory 100 and outputting the received data written to the memory 100 in order of the data inputting, a first pointer register 26 for storing the write address of the transmitted data or the read address of the transmission input data in the memory 100, and a second pointer register 36 for storing the write address of the receipt input data or the read address of the receipt output data in the memory 100.

19 Claims, 11 Drawing Sheets

| TX_W | TX_R | Data input and shift operation |
|---|---|---|
| 1 | 0 | TX_DATAin → FIFO[i1] |
| 0 | 1 | Data of FIFO[i+1] → FIFO[i]   (i= 1 ~ i1-2) |
| 1 | 1 | Data of FIFO[i+1] → FIFO[i]   (i= 1 ~ i1-2)<br>TX_DATAin → FIFO[i1-1] |

FIG. 3 (b)

| TX_W | TX_R | Fluctuations of PT_Wt |
|---|---|---|
| 1 | 0 | +1 |
| 0 | 1 | −1 |
| 1 | 1 | ±0 |

FIG. 3 (c)

| RX_W | RX_R | Data input and shift operation |
|---|---|---|
| 1 | 0 | RX_DATAin → FIFO[i2] |
| 0 | 1 | Data of FIFO[i-1] → FIFO[i]   (i= i2+2 ~ n) |
| 1 | 1 | Data of FIFO[i-1] → FIFO[i]   (i= i2+2 ~ n)<br>RX_DATAin → FIFO[i2+1] |

FIG. 3 (d)

| RX_W | RX_R | Fluctuations of PT_Wr |
|---|---|---|
| 1 | 0 | −1 |
| 0 | 1 | +1 |
| 1 | 1 | ±0 |

| TX_W | RX_W | TX_R | RX_R |
|---|---|---|---|
| 1 | 0 | 0 | 0 |
| 0 | 1 | 0 | 0 |
| 1 | 1 | 0 | 0 |
| 1 | 1 | 1 | 0 |
| 1 | 1 | 0 | 1 |

(Note that $(PT\_Wt - 1) + (n - PT\_Wr) = n$ )

| TX_W | RX_W | TX_R | RX_R |
|---|---|---|---|
| 1 | 1 | 0 | 0 |

(Note that $(PT\_Wt - 1) + (n - PT\_Wr) = n-1$ )

FIFO MEMORY DEVICE AND FIFO CONTROL METHOD

PRIOR FOREIGN APPLICATION

This application claims priority from Japanese Patent Office Application No. 11-293628, filed Oct. 15, 1999, which is hereby incorporated herein by reference in its entirety.

TECHNICAL FIELD

The present invention relates to a FIFO (First-in First-out) memory device and a FIFO control method.

BACKGROUND ART

Figure 9:
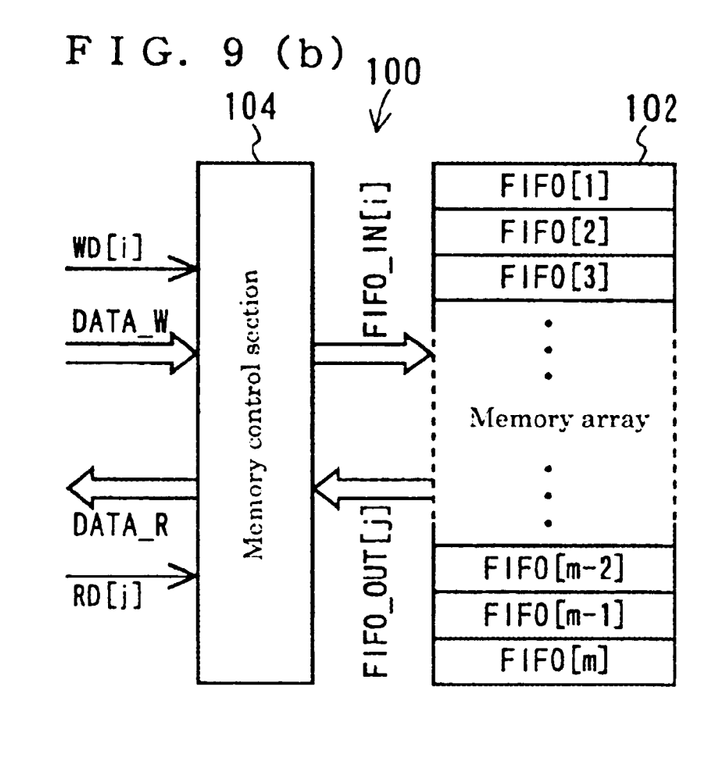
FIG. 9(a) is a fundamental conceptual view of the memory.
FIG. 9(b) is a conceptual view of the memory array and the control section.
Figure 10:
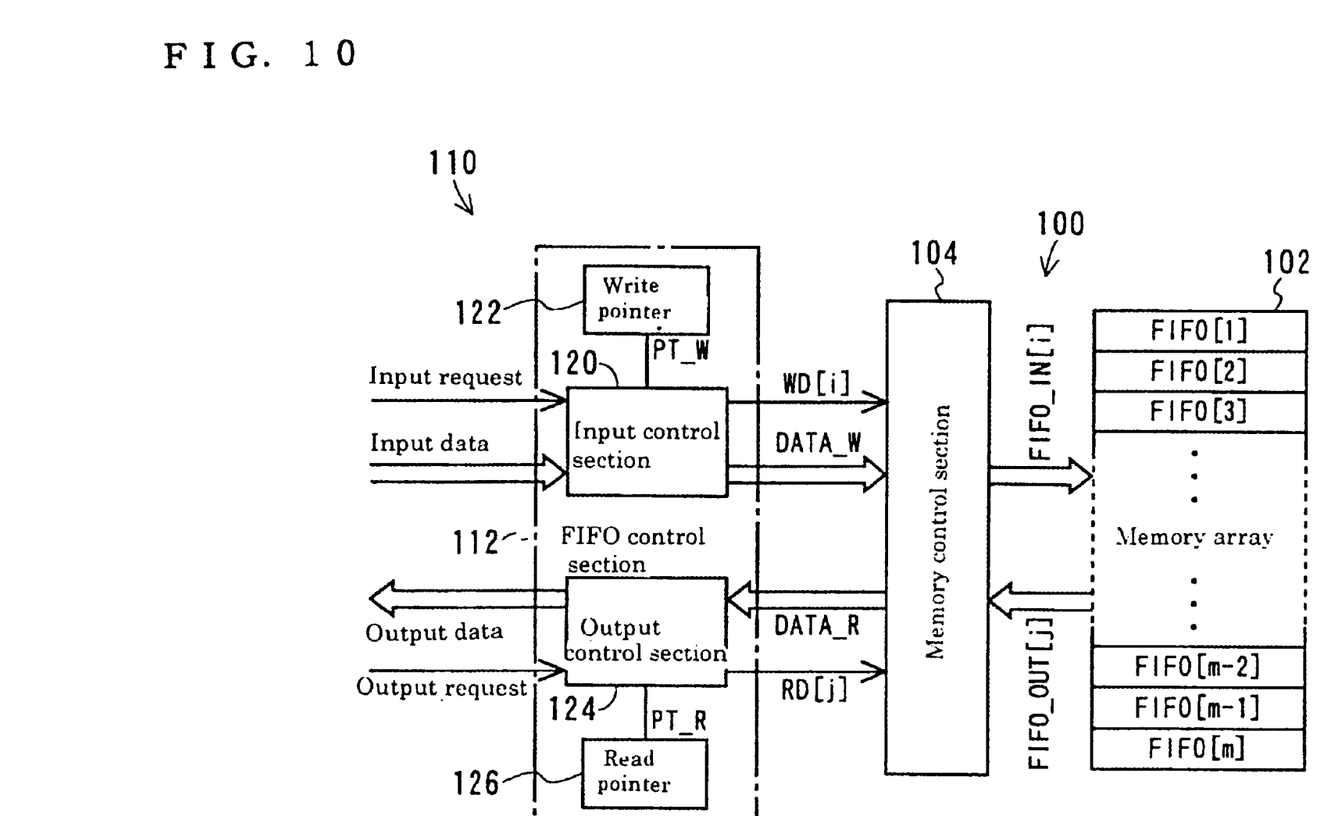
FIG. 10 is a block diagram showing an example of the structure of the FIFO memory device in the prior art.

FIG. 10 shows an example of a FIFO memory device 110. FIG. 9(b) shows an example of a memory 100 used for the FIFO memory device 110. FIG. 9(a) shows a conceptual view of a general memory 100. A control signal shown in FIG. 9(a) indicates write of data into the memory 100 or readout of data from the memory 100. An address signal indicates an address of the memory 100 to write data or to read data. When writing, the control signal indicates a write operation to write data to the address specified by the address signal. When reading, the control signal indicates a readout operation to read data from the address specified by the address signal.

FIG. 9(b) is a block diagram showing an example of the structure of the memory 100 employed for the FIFO memory device 110. The memory 100 comprises a FIFO memory array 102 and a memory control section 104. The FIFO memory array 102 is divided into m subarrays (memory rows) from [1] to [m], which are indicated by FIFO[1] to FIFO[m]. In FIG. 9(b), when input-output data, for example, has an 8-bit data width, 8-bit data (1 byte) is stored in each of the subarrays (FIFO[1], FIFO[2], . . . FIFO[m]). The memory control section 104 controls the write of data to the memory array 102 and the readout of data from the memory array 102.

Signal WD[i](i=1, 2, . . . , m) corresponds to a combination of the control signal and address signal in FIG. 9(a), which indicates write of data (DATA_W) to FIFO[i]. When the signal WD[i] is inputted to the memory control section 104, input data (DATA_W) is written to FIFO[i] of the memory array 102. FIFO_IN[i] shown in FIG. 9(b) represents the write of data to FIFO[i] of the memory array 102. Signal RD[j](j=1, 2, . . . , m) corresponds to a combination of the control signal and address signal shown in FIG. 9(a), which instructs to read data from FIFO[j]. When the signal RD[j] is inputted to the memory control section 104, the data is read from FIFO[j] in the memory array 102 to be outputted (DATA_R). FIFO_OUT[j] shown in FIG. 9(b) represents the readout of data from FIFO[j] in the memory array 102.

FIG. 10 is an example of the FIFO memory device 110 using the memory 100 shown in FIG. 9(b). The FIFO memory device 110 comprises the memory 100 and the FIFO control section 112. The FIFO control section 112 comprises an input control section 120, a write pointer register 122, an output control section 124, and a read pointer register 126. An address to write data is stored in the write pointer register 122. An address to read data is stored in the read pointer register 126. The input control section 120 controls data input (FIFO_IN[i]) and the write pointer (PT_W). The output control section 124 controls data output (FIFO_OUT[j]) and the read pointer (PT_R).

When input data and an input request are inputted to the input control section 120, the input control section 120 sends an instruction for writing (WD[i]) and the input data (DATA_W) to the memory control section 104, referring to the write pointer (PT_W). In the write pointer (PT_W), a subarray number [i] corresponding to FIFO[j] is stored. The FIFO control section 112 controls the input control section 120 and the output control section 124. For example, when an input request and an output request occur at the same time, the FIFO control section 112 allows the output control section 124 to carry out output processing after allowing the input control section 120 to carry out input processing.

Figure 11:
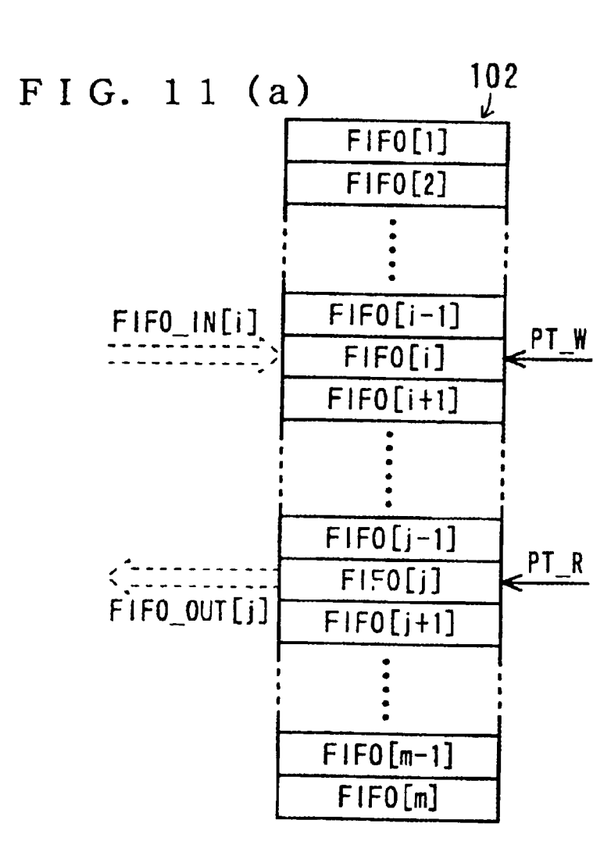
FIG. 11(a) is a conceptual view of the operation of input-output, read and write pointers.
FIG. 11(b) is a conceptual view of the operation of the write pointer at the time of input.
FIG. 11(c) is a conceptual view of the operation of the read pointer at the time of output.

FIG. 11(a) is a conceptual view showing the write pointer (PT_W) and data input (FIFO_IN[i]), read pointer (PT_R) and data output (FIFO_OUT[j]). When inputting data, the data is written to FIFO[i] specified by the write pointer (PT_W). Then, as shown in FIG. 11(b), the input control section 120 controls so that the writer pointer (PT_W) may specify FIFO[i–1] to write data next. The initial value of the write pointer (PT_W), for example, may be set to "m". In this case, the input data is sequentially stored from FIFO[m] to FIFO[1].

When outputting data, the data is read from FIFO[j] specified by the read pointer (PT_R). After that, as shown in FIG. 11(c), the output control section 124 controls so that FIFO[j–1] may be specified by the read pointer (PT_R) to be read next. When the initial value of the write pointer (PT_W) is set to "m", since data is written from FIFO[m], the initial value of the read pointer (PT_R) is set to "m". Data written from FIFO[m] is sequentially read from FIFO [m] to FIFO[1].

As described above, the inputted data is stored in the memory 100 and the data is outputted in order of the data inputting. When reading or writing has been carried out in FIFO[1], the pointer (PT_W, PT_R) is changed to specify FIFO[m]. In this FIFO memory device 110, data input and data output are specified by the write pointer (PT_W) and the read pointer (PT_R), and the pointers (PT_W, PT_R) alone are changed without moving the data (FIFO[k]), even if access to the memory 100 is performed.

When these FIFO memory devices 110 are employed for full duplex communication where transmission and receipt of data is implemented simultaneously, two FIFO memory devices such as a transmitting FIFO and a receiving FIFO are generally prepared. If one of the FIFO devices overruns or overflows, the whole FIFO devices come to overrun state even if the other FIFO device is empty because these two FIFO memory devices independently operate each other. In this case, the empty FIFO device is not utilized at all.

A FIFO memory device which is capable of switching the storage capacity ratio between a transmitting FIFO and a receiving FIFO to a predetermined ratio is disclosed as means for solving such a problem in Japanese Patent Publication No. 10-285223. With the use of this FIFO memory device, for example, when receipt of input is carried out more frequently, it is possible to switch the storage capacity ratio between the transmitting FIFO and the receiving FIFO from 1:1 to 3:7. However, since the ratio is fixed, if the receiving FIFO (70% of the total storage capacity) overflows, it will come to overrun, even if the transmitting FIFO (30% of the total storage capacity) is empty. In this case, the transmitting FIFO (30% of the total storage capacity) is not utilized at all.

SUMMARY OF THE INVENTION

It is an object of the present invention to integrate two FIFOs such as a transmitting FIFO and a receiving FIFO into one FIFO, thereby effectively utilizing a memory area.

A FIFO memory device according to the present invention comprises a first input section for inputting first data, a second input section for inputting second data, a memory for storing the first data inputted from the first input section and the second data inputted from the second input section, a first output section for outputting the first data read from the memory, a second output section for outputting the second data read from the memory, a first FIFO control section for writing the first data inputted from the first input section into the memory, reading the first data written in the memory in order of the data inputting, and outputting the first data to the first output section, and a second FIFO control section for writing the second data inputted from the second input section into the memory, reading the second data written to the memory in order of the data inputting, and outputting the second data to the second output section.

A FIFO control method according to the present invention comprises the steps of writing the first data inputted from the first input section to the memory, reading the first data written from the first input section to the memory in order of the data inputting and outputting the first data to the first output section, writing the second data inputted from the second input section to the memory, and reading the second data written from the second input section to the memory in order of the data inputting and outputting the second data to the second output section.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIGS. 2(a) through 2(c) are conceptual views showing memory arrays in the FIFO memory devices.

FIGS. 4(a) through (d) are conceptual views showing memory arrays in the FIFO memory devices shown in FIG. 1.

FIGS. 7(a) through 7(c) are conceptual views showing memory arrays in the FIFO memory devices shown in FIG. 6.

FIGS. 8(a) through 8(d) are conceptual views showing memory arrays in the FIFO memory devices shown in FIG. 6. FIGS. 8(a) and 8(b) are conceptual views of the shift operation of the transmission read pointer and memory data at the time of inputting the transmitted data. FIGS. 8(c) and (d) are conceptual views of the shift operation of the receipt read pointer and memory data at the time of inputting the received data.

FIGS. 9(a) and 9(b) are conceptual views respectively showing a memory of the FIFO memory device.

FIGS. 11(a) through 11(c) are conceptual views showing the memory arrays shown in FIG. 10.

Reference Characters of the Drawings 10, 40: FIFO memory device
12, 42: FIFO control section
20, 50: Transmission control section
22, 54: Transmission output control section
24, 52: Transmission input control section
26: Transmission write pointer register
30, 60: Receiving control section
32, 64: Receipt output control section
34, 62: Receipt input control section
36: Receipt write point register
56: Transmission read pointer register
66: Receipt read pointer register
100: Memory
102: FIFO memory array
104: Memory control section
110: FIFO memory device (prior art)
112: FIFO control section (prior art)
120: Input control section
122: Write pointer register
124: Output control section
126: Read pointer register

BEST MODE FOR CARRYING OUT THE INVENTION

Next, a preferred embodiment of a FIFO memory device and a FIFO control method according to the present invention will be described in detail with reference to the drawings by taking, as an example, the case in which they are used for a FIFO for full duplex communication capable of carrying out transmission and receipt at the same time.

Figure 1:
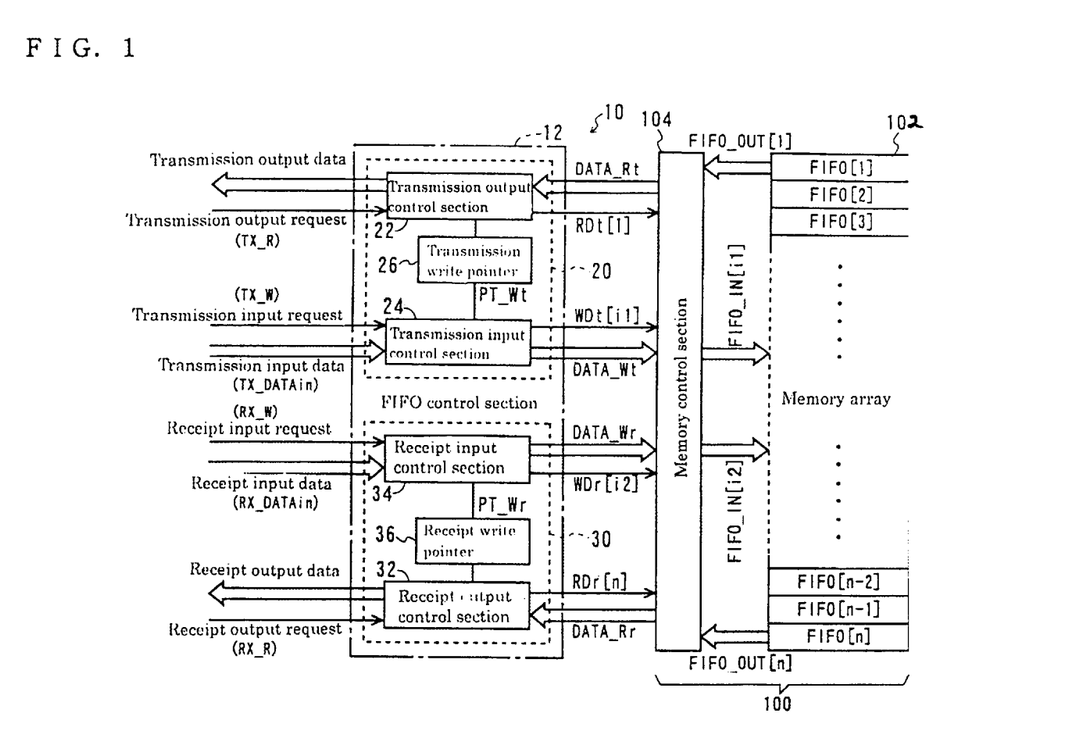
FIG. 1 is a block diagram showing an example of the structure of a FIFO memory device according to the present invention.

FIG. 1 is a block diagram showing an example of the structure of a FIFO memory device 10 according to the present invention. The FIFO memory device 10 comprises a FIFO control section 12 and a memory 100. The FIFO control section 12 includes a transmission control section 20 for carrying out FIFO control on the transmission side and a receipt control section 30 for carrying out FIFO control on the receiving side. The transmission control section 20 has a transmission input control section 24 for controlling the write of transmitted data, a transmission write pointer register 26 for storing the write address for the transmitted data, and a transmission output control section 22 for controlling the readout of the transmitted data. The receipt control section 30 has a receipt input control section 34 for controlling the write of received data, a receipt write pointer register 36 for storing the write address for the received data, and a receipt output control section 32 for controlling the readout of the received data.

Any type of memory may be used as the memory for storing the transmitted data and the received data. In the present embodiment, a memory like the memory 100 shown in FIG. 9($b$) is used. In the same manner as in the prior art, the memory 100 writes data to a subarray FIFO[k] on receipt of a signal WD[k] (WDt[k], WDr[k]), and reads data from the subarray FIFO[k] on receipt of a signal RD[k] (RDt[k], RDr[k])(k=1, 2, . . . , n).

On receipt of transmission input data (TX_DATAin) and a transmission input request (TX_W) from a transmission input section which is not shown, the transmission input control section 24 transmits input data (DATA_Wt=TX_DATAin) to a memory control section 104 and sends a signal WDt[i1](i1=1, 2, . . . , n) by referring to the transmission write pointer (PT_Wt). The signal WDt[i1] indicates write to a subarray FIFO[i1]. A subarray number [i1] corresponding to the subarray FIFO[i1] is stored in the transmission write pointer (PT_Wt). The memory control section 104 writes the data (DATA_Wt) to FIFO[i1] of a memory array 102 on receipt of the signal WDt[i1] and the input data (DATA_Wt).

The transmission output control section 22 sends a signal RDt[1] to the memory control section 104 on receipt of the transmission output request (TX_R). The signal RDt[1] indicates read from FIFO[1]. On receipt of the signal RDt [1], the memory control section 104 reads data stored in FIFO[1] from the memory array 102 and transmits the same data to the transmission output control section 22 (DATA_Rt). Then, the data of FIFO[1] is outputted from the transmission output control section 22 to a transmission output section (not shown). After the data of FIFO[1] is read, the transmitted data in the memory 100 is shifted as will be described below so that the data of FIFO[2] is stored in FIFO[1].

On receipt of receipt input data (RX_DATAin) and a receipt input request (RX_W) from a receipt input section which is not shown, the receipt input control section 34 transmits input data (DATA_Wr=RX_DATAin) to the memory control section 104 and sends a signal WDr[i2](i2= 1, 2, . . . , n) by referring to the receipt write pointer (PT_Wr). The signal WDr[i2] indicates write to FIFO[i2]. A subarray number [i2] corresponding to the subarray FIFO [i2] is stored in the transmission write pointer (PT_Wr) (i1≦i2). The memory control section 104 writes the data (DATA_Wr) to FIFO[i2] of the memory array 102 on receipt of the signal WDr[i2] and the input data (DATA_Wr).

The receipt output control section 32 sends a signal RDr[n] to the memory control section 104 on receipt of the receipt output request (RX_R). The signal RDr[n] indicates read from FIFO[n]. On receipt of the signal RDr[n], the memory control section 104 reads data stored in FIFO[n] from the memory array 102 and transmits the same data to the receipt output control section 32 (DATA_Rr). Then, the data of FIFO[n] is outputted from the receipt output control section 32 to a receipt output section (not shown). After the data of FIFO[n] is read, the received data in the memory 100 is shifted as will be described below so that the data of FIFO[n−1] is stored in FIFO[n].

The transmission input control section 24, the transmission output control section 22, the receipt input control section 34 and the receipt output control section 32 are controlled by the FIFO control section 12. For example, when the transmission input request or/and the transmission output request and the receipt input request or/and the receipt output request are generated at the same time, the FIFO control section 12 controls so that the transmission input control section 24 or/and the transmission output control section 22 is/are first caused to process the transmitted data and then the receipt input control section 34 or/and then the receipt control section 32 is/are caused to process the received data.

Figure 2:
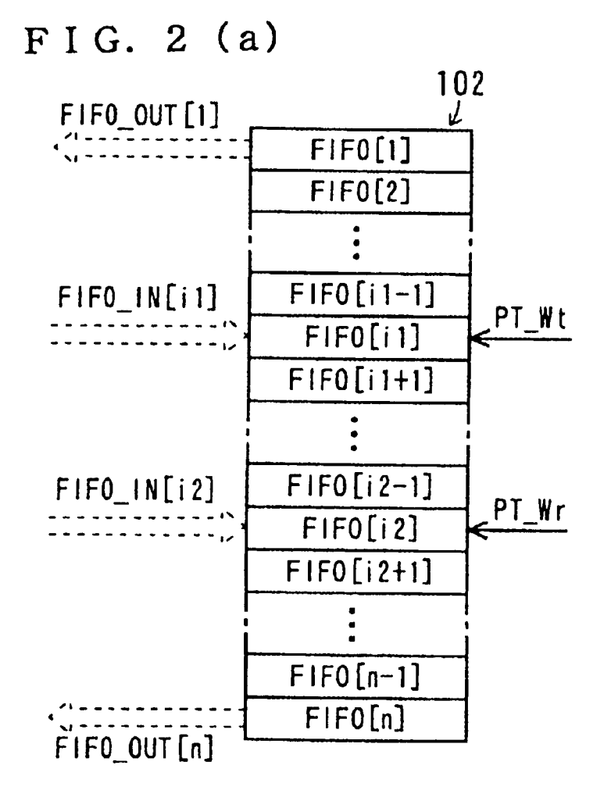
FIG. 2(a) is a conceptual view of a transmission input-output, a receipt input-output, a transmission write pointer, and a receipt write pointer.
FIG. 2(b) is a conceptual view of the operation of the transmission write pointer at the time of inputting the transmitted data.
FIG. 2(c) is a conceptual view of the operation of the receipt write pointer at the time of inputting the received data.

As described above, in the present embodiment, the transmitted input (DATA_Wt=TX_DATAin) is written to FIFO[i1] specified by the transmission write pointer (PT_Wt), and the received input (DATA_Wr=RX_DATAin) is written to FIFO[i2] specified by the receipt write pointer (PT_Wr). In addition, the transmitted output is fixed to FIFO[1] and the received output is fixed to FIFO[n]. FIG. 2($a$) is a conceptual view showing the input (FIFO_IN[i1]) and output (FIFO_OUT[1]) of the transmitted data to and from the memory array 102 and the transmission write pointer (PT_Wt), and the input (FIFO_IN[i2]) and output (FIFO_OUT[n]) of the received data and the receipt write pointer (PT_Wr).

Figure 3:
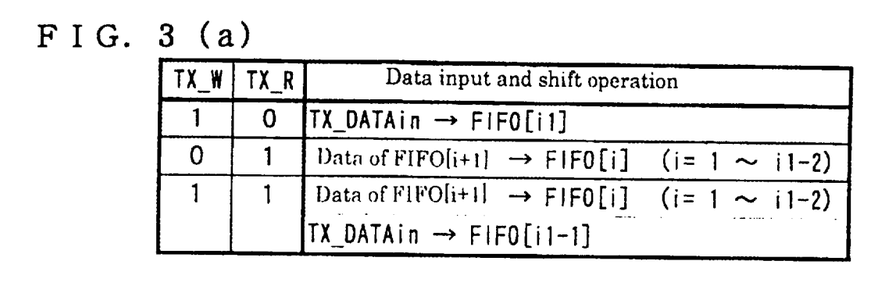
FIGS. 3(a) through (d) are drawings showing the shift operation and the pointer operation of the FIFO memory device shown in FIG. 1.

Next, description will be given to the operation of the transmission pointer (PT_Wt) which is carried out when the transmitted data is inputted and the shift operation of the transmitted data which is carried out in the memory array 102 when the transmitted data is outputted. FIG. 3($a$) shows the data input and data shift operation corresponding to the input-output request for the transmitted data. FIG. 3($b$) shows the operation of the transmission pointer (PT_Wt) corresponding to the input-output request for the transmitted data.

When only the transmission input is to be carried out (TX_W="1", TX_R="0"), TX_DATAin is inputted to FIFO[i1](i1=PT_Wt) as shown in FIG. 3($a$) and the address PT_Wt is then increased by one as shown in FIG. 3($b$). The change in the pointer (PT_Wt) is stored in the transmission write pointer register 26. Thus, the transmission input control section 24 controls in such a manner that the transmitted input data (TX_DATAin) is inputted to FIFO[i1] specified by the pointer (PT_Wt) and the pointer (PT_Wt) is then shifted by one to specify FIFO[i1+1] as shown in FIG. 2($b$). The initial value of the transmission write pointer (PT_Wt) is set to "1". Therefore, the transmitted input data is sequentially stored from FIFO[1] to FIFO[n].

Figure 4:
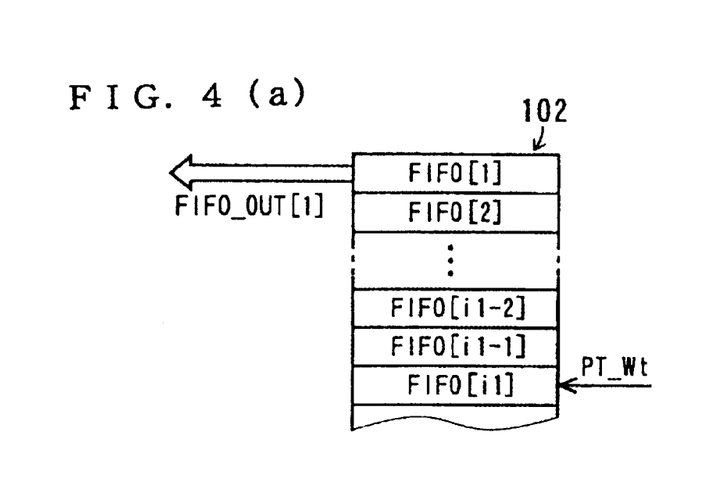
FIGS. 4(a) and 4(b) are conceptual views respectively showing the shift operation of the transmission write pointer and memory data at the time of outputting the transmitted data.
FIGS. 4(c) and 4(d) are conceptual views respectively showing the shift operation of the receipt write pointer at the time of outputting the received data.

When only the transmission output is to be carried out (TX_W="0", TX_R="1"), FIFO[1] is read and the data of FIFO[i+1] is then moved to FIFO[i](i=1 to i1−2) respectively as shown in FIG. 3($a$) and the address PT_Wt is thereafter decreased by one as shown in FIG. 3($b$). Thus, the control is carried out in such a manner that the data of FIFO[1] is outputted and the data of FIFO[2] to FIFO[i1−1] is shifted to FIFO[1] to FIFO[i1−2] respectively and the pointer (PT_Wt) is shifted by one to specify FIFO[i1−1] as shown in FIGS. 4(a) and 4(b). The transmission output section 22 carries out the outputting from FIFO[1] and the shifting of the pointer (PT_Wt). The transmitted data is shifted by controlling the transmission input control section 24 and the transmission output control section 22 by means of the FIFO control section 12. Thus, the transmitted output data is always read from FIFO[1]. After the data of FIFO[1] is read, the data of FIFO[2] is stored in FIFO[1] by the shift operation. Since all the transmitted data (FIFO[2] to FIFO[i1−1]) stored in the memory 100 is shifted, the order of the inputting of the transmitted data is maintained.

When the transmission input and the transmission output are carried out at the same time (TX_W="1", TX_R="1"), the transmission input control section 24 and the transmission output control section 22 are controlled by the FIFO control section 12 and a combined processing of the transmission output processing and the transmission input processing described above is carried out. The data of FIFO[1] is outputted by the transmission output control section 22, the data of FIFO[2] to FIFO[i1−1] is shifted to FIFO[1] to FIFO[i1−2] by the transmission input control section 24 and the transmission output control section 22 respectively, and the transmitted input data (TX_DATAin) is inputted to FIFO[i1−1] by the transmission input control section 24. The pointer (PT_Wt) is decremented by one when the shift of FIFO[2] to FIFO[i1−1] is carried out, and is incremented by one when the transmitted input data (TX_DATAin) is inputted. For this reason, the pointer PT_Wt finally indicates FIFO[i1]. Thus, it is possible to implement the FIFO operation of the transmitted data having its input specified by the pointer (PT_Wt) and its output fixed to the FIFO[1].

The FIFO operation of the received data can also be implemented in the same manner as the transmitted data. FIG. 3(c) shows the data input and data shift operation corresponding to the input-output request for the received data. FIG. 3(d) shows the operation of the receipt pointer (PT_Wr) corresponding to the input-output request for the received data.

When only the receipt input is to be carried out (RX_W="1", RX_R="0"), RX_DATAin is inputted to FIFO[i2](i2=PT_Wr) as shown in FIG. 3(c) and the address of the PT_Wr is then decreased by one as shown in FIG. 3(d). The change in the pointer (PT_Wr) is stored in the receipt write pointer register 36. Thus, the receipt input control section 34 controls in such a manner that the received input data (RX_DATAin) is inputted to FIFO[i2] specified by the pointer (PT_Wr) and the pointer (PT_Wr) is then shifted by one to specify FIFO[i2−1] as shown in FIG. 2(c). The initial value of the receipt write pointer (PT_Wr) is set to "n". Consequently, the received input data is sequentially stored from FIFO[n] to FIFO[1].

When only the receipt output is to be carried out (RX_W="0", RX_R="1"), FIFO[n] is read and the data of FIFO[i−1] is then moved to FIFO[i](i=i2+2 to n) respectively as shown in FIG. 3(c) and the address of the PT_Wr is thereafter increased by one as shown in FIG. 3(d). Thus, the control is carried out in such a manner that the data of FIFO[n] is outputted and the data of FIFO[i2+1] to FIFO[n−1] is shifted to FIFO[i2+2] to FIFO[n] respectively and the pointer (PT_Wr) is shifted by one to specify FIFO[i2+1] as shown in FIGS. 4(c) and 4(d). The receipt output control section 32 carries out the outputting from FIFO[n] and the shifting of the pointer (PT_Wr). The received data is shifted by controlling the receipt input control section 34 and the receipt output control section 32 by means of the FIFO control section 12. Thus, the received output data is always read from FIFO[n]. After the data of FIFO[n] is read, the data of FIFO[n−1] is stored in FIFO[n] by the shift operation. Since all the received data (FIFO[i2+1] to FIFO[n−1]) stored in the memory 100 is shifted, the order of the inputting of the received data is maintained.

When the receipt input and the receipt output are to be carried out (RX_W="1", RX_R="1"), the receipt input control section 34 and the receipt output control section 32 are controlled by the FIFO control section 12 and a combined processing of the receipt output processing and the receipt input processing described above is carried out. The data of FIFO[n] is outputted by the receipt output control section 32, the data of FIFO[i2+1] to FIFO[n−1] is shifted to FIFO[i2+2] to FIFO[n] by the receipt input control section 34 and the receipt output control section 32 respectively, and the received input data (RX_DATAin) is inputted to FIFO[i2+1] by the receipt input control section 34. The pointer (PT_Wr) is decremented by one when the shift of FIFO[i2+1] to FIFO[n−1] is carried out, and is incremented by one when the received input data (RX_DATAin) is inputted. For this reason, the pointer PT_Wr finally indicates FIFO[i2]. Thus, it is possible to implement the FIFO of the received data with its input specified by the pointer (PT_Wr) and its output fixed to FIFO[n].

Figure 5:
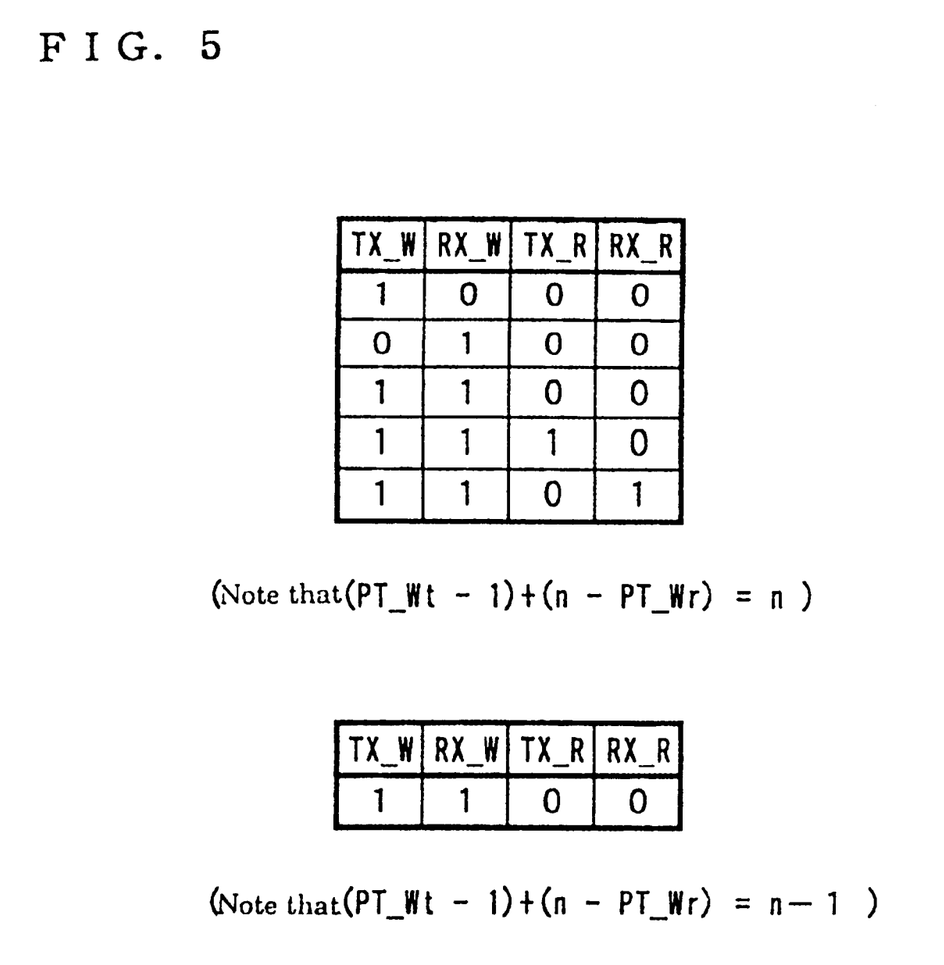
FIG. 5 is a chart showing conditions for deciding that overrun is caused on the FIFO memory device shown in FIG. 1.

The memory array 102 includes n subarrays of FIFO[1] to FIFO[n]. If the total of the transmitted data and the received data which are stored in the memory 100 is greater than n, overrun (overflow) is caused. That is, when the write is to be newly carried out with data written to all of FIFO[1] to FIFO[n], the overrun is caused. FIG. 5 shows the conditions for deciding that the overrun is caused. It is determined that the overrun state occurs (1) when the memory array 102 has no space $$(PT\_Wt-1)+(n-PT\_Wr)=n, \text{ and}$$

(2a) when only the inputting of the received data or/and the transmitted data is carried out:

$$(TX\_W="1", RX\_W="0", TX\_R="0", RX\_R="0"), \text{ or}$$

$$(TX\_W="0", RX\_W="1", TX\_R="0", RX\_R="0"), \text{ or}$$

$$(TX\_W="1", RX\_W="1", TX\_R="0", RX\_R="0")$$

Or (2b) when the inputting and the outputting are carried out at the same time and the inputting data is more than the output data:

$$(TX\_W="1", RX\_W="1", TX\_R="1", RX\_R="0"), \text{ or}$$

$$(TX\_W="1", RX\_W="1", TX\_R="0", RX\_R="1")$$

Furthermore, the overrun state will also occur (1) when the memory array 102 has only one space:

$$(PT\_Wt-1)+(n-PT\_Wr)=n-1, \text{ and}$$

(2) when only the inputting of the received data and the transmitted data is carried out:

$$(TX\_W="1", RX\_W="1", TX\_R="0", RX\_R="0")$$

The decision of the overrun is carried out by the FIFO control section 12.

Moreover, when a request for output is given without data stored, under run (underflow) is caused. The underrun will occur (1) when the transmission write pointer (PT_Wt) specifies FIFO[1] and when the transmission input request (TX_W) is not given and only the transmission output request (TX_R) is received or (2) when the receipt write pointer (PT_Wr) specifies FIFO[n] and when the receipt input request (RX_W) is not given and only the receipt output request (RX_R) is received. The decision of the underrun is carried out by the FIFO control section 12.

Thus, the FIFO memory device according to the present invention can use one FIFO as a transmitting FIFO and a receiving FIFO. The ratio of the transmitted data to the received data in the memory can be varied flexibly. The overrun is not caused before the memory is filled. For this reason, the storage capacity of the memory can be utilized effectively and the overrun is not caused before the storage capacity of the memory is completely used up.

Figure 6:
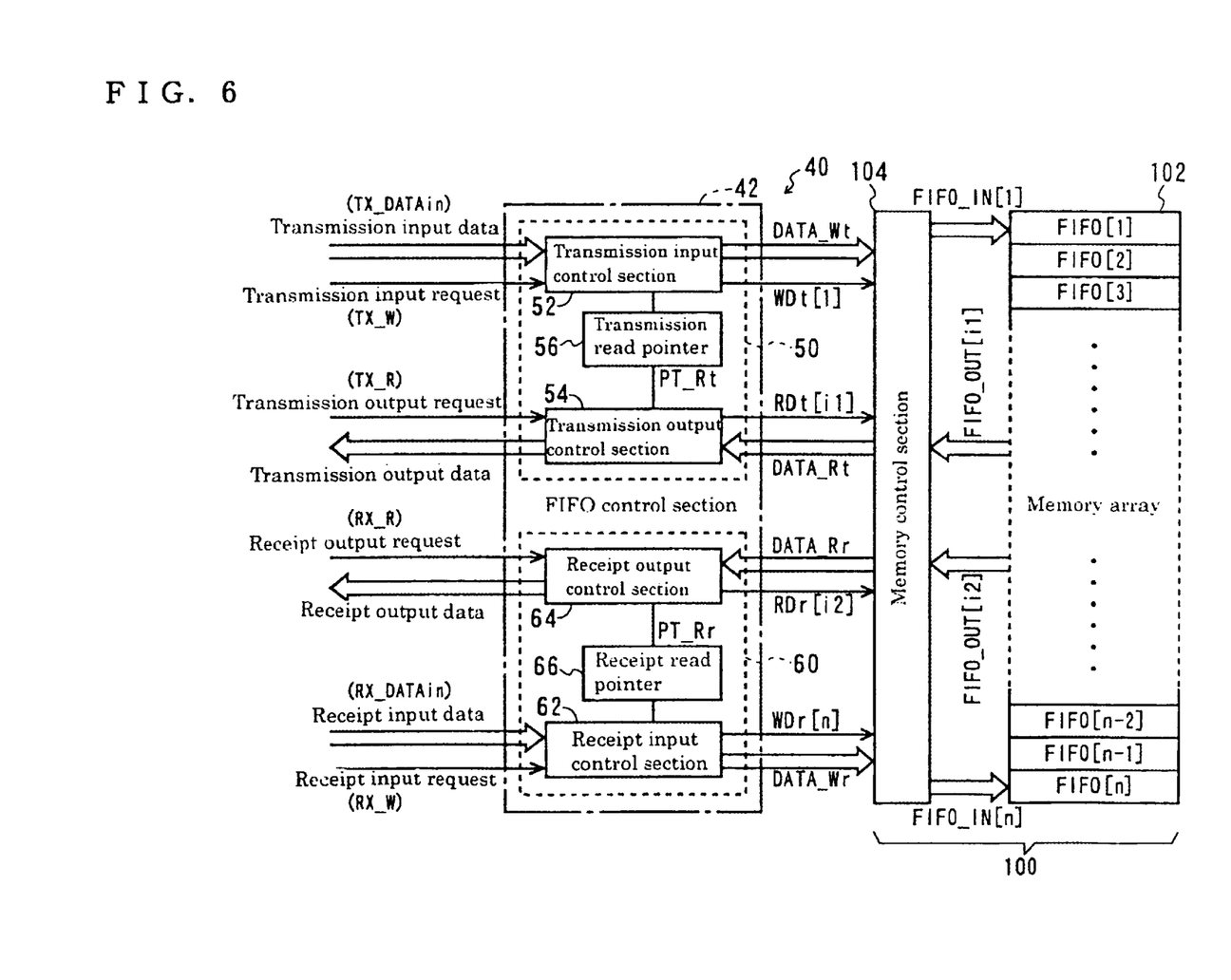
FIG. 6 is a block diagram showing an example of the other structure of the FIFO memory device according to the present invention.
Figure 7:
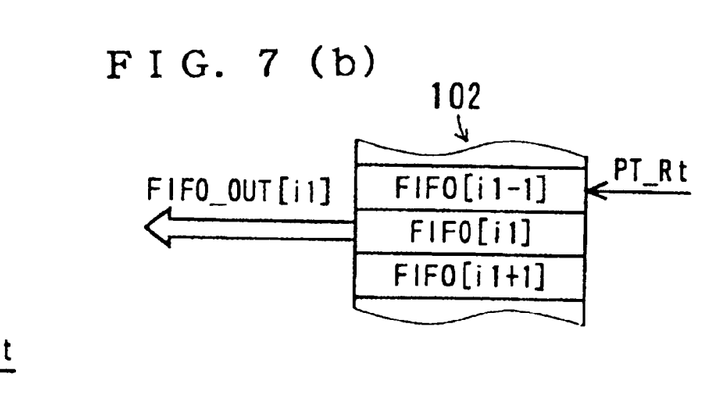
FIG. 7(a) is a conceptual view of the transmission input-output, receipt input-output, transmission read pointer, and receipt read pointer.
FIG. 7(b) is a conceptual view of the operation of the transmission read pointer at the time of outputting the transmitted data.
FIG. 7(c) is a conceptual view of the operation of the receipt read pointer at the time of outputting the received data.

While the embodiment of the present invention has been described above, the FIFO memory device and the FIFO control method according to the present invention can be carried out in other manners. For example, as shown in FIG. 7(a), the address at which data is inputted can be fixed and the address at which data is outputted can be specified by the pointer (PT_Rt, PT_Rr). FIG. 6 shows an example of the structure of the FIFO memory device for performing FIFO shown in FIG. 7(a). In the FIFO memory device 40 shown in FIG. 6, the transmission input and the transmission output shown in FIG. 1 are reversed and the receipt input and the receipt output shown in FIG. 1 are reversed. The write of the transmitted input data (TX_DATAin) is fixed to FIFO[1]. The transmitted output data is read from FIFO[i1] specified by the transmission read pointer (PT_Rt). The write of the received input data (RX_DATAin) is fixed to FIFO[n]. The received output data is read from FIFO[i2] specified by the receipt read pointer (PT_Rr).

Figure 8:
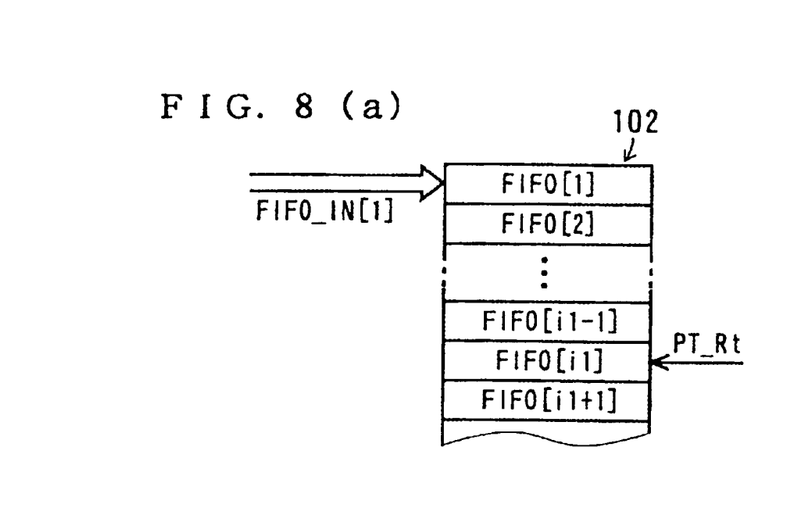

When the transmitted data is to be read, the data of FIFO[i1] specified by the transmission read pointer (PT_Rt) is read and the pointer (PT_Rt) is then shifted by one to specify FIFO[i1−1] as shown in FIG. 7(b). When the transmitted data is to be written, the data of FIFO[1] to FIFO [i1−1] is shifted to FIFO[2] to FIFO[i1] respectively and the pointer (PT_Rt) is then shifted by one to specify FIFO[i1+1] and the transmitted input data (TX_DATAin) is thereafter inputted to FIFO[1] as shown in FIGS. 8(a) and 8(b).

When the received data is to be read, the data of FIFO[i2] specified by the receipt read pointer (PT_Rr) is read and the pointer (PT_Rr) is then shifted by one to specify FIFO[i2+1] as shown in FIG. 7(c). When the received data is to be written, the data of FIFO[i2+1] to FIFO[n] is shifted to FIFO[i2] to FIFO[n−1] respectively and the pointer (PT_Rr) is then shifted by one to specify FIFO[i2−1] and the received input data (RX_DATAin) is thereafter inputted to FIFO[n] as shown in FIGS. 8(c) and 8(d).

According to the FIFO memory device and the FIFO memory method of the present invention, a single memory can be substituted for two input and output memories. The memory capacities for transmission and reception can be varied flexibly depending on the input-output state. The overrun is not caused on the FIFO memory before the storage capacity of the FIFO memory is completely used up. For this reason, the storage capacity can be utilized effectively, which makes it difficult for the overrun to be caused.

The embodiment of the FIFO memory device and the FIFO control method according to the present invention has variously been described so far on the basis of the accompanying drawings, but the present invention is not limited to the FIFO memory device shown in the drawings. Also, any modification, variations or equivalent arrangements which may occur to those skilled in the art should be considered to be within the scope of the invention.

There have thus been shown and described FIFO Memory Device and FIFO Control Method which fulfill all the objects and advantages sought therefor. Many changes, modifications, variations and other uses and applications of the subject invention will, however, become apparent to those skilled in the art after considering this specification and the accompanying drawings which disclose the preferred embodiments thereof.

All such changes, modifications, variations and other uses and applications which do not depart from the sprit and scope of the invention are deemed to be covered by the invention, which is to be limited only by the claims which follow.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A FIFO memory device comprising:
    a first input section for inputting first data;
    a second input section for inputting second data;
    a memory for storing the first data inputted from the first input section and the second data inputted from the second input section;
    a first output section for outputting the first data read from the memory;
    a second output section for outputting the second data read from the memory;
    first FIFO control section for writing the first data inputted from the first input section into the memory, reading the first data written in the memory in order of the data inputting, and outputting the first data to the first output section;
    a second FIFO control section for writing the second data inputted from the second input section into the memory, reading the second data written in the memory in order of the data inputting, and outputting the second data to the second output section; and
    wherein the memory comprises a common memory space, and said first data and said second data share the common memory space when written to the memory by the first FIFO control section and the second FIFO control section, respectively, with first data capacity and second data capacity in the common memory space varying flexibly.

2. The FIFO memory device according to claim 1, wherein one of the first data and the second data is transmitted data to be used for full duplex communication, and the other data is received data to be used for full duplex communication.

3. The FIFO memory device of claim 1, wherein either said first data capacity or said second data capacity can flexibly vary to comprise almost all of the common memory space.

4. The FIFO memory device according to claim 1, wherein said first FIFO control section includes:
   a first pointer register for storing the write address of said memory at which the first data is written or the read address of said memory at which the first data is read; and
   a second pointer register for storing the write address of said memory at which the second data is written or the read address of said memory at which the second data is read.

5. The FIFO memory device according to claim 4, further includes means for determining if said memory overflows based on the address stored in the first pointer register, the address stored in the second pointer resister, the input-output status of the first data, and the input-output status of the second data.

6. The FIFO memory device according to claim 4, further includes means for determining if said memory underflows based on the address stored in the first pointer register, the address stored in the second pointer resister, the input-output status of the first data, and the input-output status of the second data.

7. The FIFO memory device according to claim 4, wherein the address of said memory for writing the first data inputted from said first input section is stored in the first pointer register and the address of said memory for reading the first data outputted to said first output section is fixed to a predetermined first fixed address, and wherein the address of said memory for writing the second data inputted from said second input section is stored in the second pointer register and the address of said memory for reading the second data outputted to said second output section is fixed to a predetermined second fixed address.

8. The FIFO memory device according to claim 2, further comprising:
   means for storing the address of said memory for writing the first data newly inputted from said first input section in the first pointer register as a result of write of the first data inputted from said first input section into said memory,
   means for moving the first data stored in said memory so that the first data to be subsequently outputted to said first output section may be stored in the first fixed address as a result of readout of the first data outputted to said first output section from said memory; and
   means for storing the address of said memory for writing the second data newly inputted from the second input section in the second pointer register as a result of write of the second data inputted from said second input section into said memory;
   means for moving the second data stored in said memory so that the second data to be subsequently outputted to the second output section may be stored in the second fixed address as a result of readout of the second data outputted to said second output section from said memory.

9. The FIFO memory device according to claim 4, wherein the address of said memory for writing the first data inputted from said first input section is fixed to a predetermined third fixed address, and the address of said memory for reading the first data outputted to said first output section is stored in the first pointer register, and wherein the address of said memory for writing the second data inputted from said second input section is fixed to a predetermined fourth fixed address and the address of said memory for reading the second data outputted to said second output section is stored in the second pointer register.

10. The FIFO memory device according to claim 9, further comprising:
   means for moving the first data stored in said memory to prevent the first data which has already been stored in the third fixed address from being overwritten immediately before writing the first data inputted from said first input section to the third fixed address of said memory;
   means for storing the address of said memory for reading the first data to be subsequently outputted to said first output section in the first pointer register as a result of the readout of the first data outputted to said first output section from said memory;
   means for moving the second data stored in said memory to prevent the second data which have already been stored in the fourth fixed address from being overwritten immediately before writing the second data inputted from said second input section to the fourth fixed address of said memory; and
   means for storing the address of said memory for reading the second data to be subsequently outputted to said second output section in the second pointer register as a result of readout of the second data outputted to said second output section from said memory.

11. A FIFO control method comprising:
   writing first data inputted from a first input section to a memory;
   reading the first data written from the first input section to the memory in order of the data inputting and outputting the first data to a first output section;
   writing the second data inputted from a second input section to the memory; and
   reading the second data written from the second input section to the memory in order of the data inputting and outputting the second data to a second output section;
   wherein said memory comprises a common memory space, and said first data and said second data share the common memory space when written to the memory, with first data capacity and second data capacity in the common memory space varying flexibly.

12. The FIFO control method of claim 11, wherein either said first data capacity or said second data capacity can flexibly vary to comprise almost all of the common memory space.

13. The FIFO control method according to claim 11, wherein said step of writing the first data to said memory includes the steps of:
   writing the first data inputted from the first input section to the address of said memory specified by a first pointer; and
   storing in said first pointer the address of said memory for writing the first data to be newly inputted from the first input section after write of the first data;
   wherein said step of outputting the first data to the first output section includes the steps of:
      reading the first data from a predetermined first fixed address of said memory; and
      moving the first data stored in said memory so that the first data to be subsequently outputted to the first output section may be stored in the first fixed address after output of the first data;
   wherein said step of writing the second data to said memory includes the steps of:
      writing the second data inputted from the second input section to the address of said memory specified by a second pointer; and storing in said second pointer the address of said memory for writing the second data to be newly inputted from the second input section after write of the second data;

wherein said step of outputting the second data to the second output section includes the steps of:

reading the second data from a predetermined second fixed address of said memory; and moving the second data stored in said memory so that the second data to be subsequently outputted to the second output section may be stored in the second fixed address after output of the second data.

14. The FIFO control method according to claim 13, further includes the step of determining if said memory underflows based on the address stored in the first pointer, the address stored in the second pointer, the input-output status of the first data, and the input-output status of the second data.

15. The FIFO control method according to claim 13, further includes the step of determining if said memory overflows based on the address stored in the first pointer, the address stored in the second pointer, the input-output status of the first data, and the input-output status of the second data.

16. The FIFO control method according to claim 15, further includes the step of determining if said memory underflows based on the address stored in the first pointer, the address stored in the second pointer, the input-output status of the first data, and the input-output status of the second data.

17. The FIFO control method according to claim 11, wherein said step of writing the first data to said memory includes the steps of:

moving the first data stored in said memory immediately before writing the first data to a predetermined third fixed address in which the first data to be newly inputted from the first input section is written; and writing the first data newly inputted from the first input section to the third fixed address after the move of the first data;

wherein said step of outputting the first data to the first output section includes the steps of:

reading the first data from the address of said memory specified by a first pointer; and storing in said first pointer the address of said memory for reading the first data to be subsequently outputted to the first output section after readout of the first data;

wherein said step of writing the second data to said memory includes the steps of:

moving the second data stored in said memory immediately before writing the second data to a predetermined fourth fixed address in which the second data to be newly inputted from the second input section is written; and writing the second data newly inputted from the second input section to the fourth fixed address after the move of the second data; and wherein said step of outputting the second data to said second output section includes the steps of:

reading the second data outputted to the second output section from the address of said memory specified by a second pointer; and storing in said second pointer the address of said memory for reading the second data to be subsequently outputted to the second output section after readout of the second data.

18. The FIFO control method according to claim 17, further includes the step of determining if said memory overflows based on the address stored in the first pointer, the address stored in the second pointer, the input-output status of the first data, and the input- output status of the second data.

19. The FIFO control method according to claim 17, further includes the step of determining if said memory underflows based on the address stored in the first pointer, the address stored in the second pointer, the input-output status of the first data, and the input-output status of the second data.

* * * * *

UNITED STATES PATENT AND TRADEMARK OFFICE
CERTIFICATE OF CORRECTION

PATENT NO. : 6,339,558 B1
DATED : January 15, 2002
INVENTOR(S) : Ioki

It is certified that error appears in the above-identified patent and that said Letters Patent is hereby corrected as shown below:

Column 10,
Line 42, insert -- a -- before the word first at the beginning of the sentence Signed and Sealed this Thirtieth Day of April, 2002

Attest:

Attesting Officer

JAMES E. ROGAN
Director of the United States Patent and Trademark Office